(12) United States Patent
Mou et al.

(10) Patent No.: US 10,773,274 B2
(45) Date of Patent: Sep. 15, 2020

(54) MINIATURE FLUID CONTROL DEVICE

(71) Applicant: Microjet Technology Co., Ltd., Hsinchu (TW)

(72) Inventors: Hao-Jan Mou, Hsinchu (TW);
Ying-Lun Chang, Hsinchu (TW);
Shih-Chang Chen, Hsinchu (TW);
Chih-Feng Lin, Hsinchu (TW);
Yung-Lung Han, Hsinchu (TW);
Chi-Feng Huang, Hsinchu (TW);
Chang-Yen Tsai, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 16/240,297

(22) Filed: Jan. 4, 2019

(65) Prior Publication Data

US 2019/0247880 A1    Aug. 15, 2019

(30) Foreign Application Priority Data

Feb. 9, 2018 (TW) .............................. 107104668 A

(51) Int. Cl.
*B08B 17/06* (2006.01)
*F16K 99/00* (2006.01)
(Continued)

(52) U.S. Cl.
CPC ........ *B05B 17/0653* (2013.01); *F04B 43/046* (2013.01); *F04B 45/047* (2013.01);
(Continued)

(58) Field of Classification Search
CPC ............... F16K 99/0015; F16K 99/048; F16K 99/0048; F04B 43/046; B05B 17/0635
See application file for complete search history.

(56) References Cited

U.S. PATENT DOCUMENTS 5,079,472 A * 1/1992 Uhl ........................ F16K 31/006
310/330
6,142,444 A * 11/2000 Kluge ........................ F15C 3/04
137/831
(Continued)

FOREIGN PATENT DOCUMENTS

CN        206017108 U      3/2017
CN        206035774 U      3/2017
(Continued)

OTHER PUBLICATIONS

Extended European Search Report, dated Apr. 12, 2019, for European Application No. 19150330.9.

*Primary Examiner* — Kevin L Lee
(74) *Attorney, Agent, or Firm* — Birch, Stewart, Kolasch & Birch, LLP

(57) ABSTRACT

A miniature fluid control device is provided and includes a gas inlet plate, a resonance plate and a piezoelectric actuator. The resonance plate is assembled and combined with the gas inlet plate. The piezoelectric actuator is assembled and combined with the resonance plate. The piezoelectric actuator includes a suspension plate, an outer frame, at least one bracket and a piezoelectric plate. The suspension plate has a first surface and a second surface. The outer frame is arranged around the suspension plate and has an assembling surface. The piezoelectric plate is attached on the second surface. The at least one bracket is formed between the suspension plate and the outer frame as making the first surface of the suspension plate non-coplanar with the assembling surface of the outer frame, so that a specific chamber spacing is maintained between the first surface of the suspension plate and the resonance plate.

7 Claims, 3 Drawing Sheets

(51) Int. Cl.
  *B05B 17/06*   (2006.01)
  *F04D 33/00*   (2006.01)
  *F04B 43/04*   (2006.01)
  *F04B 45/047*  (2006.01)

(52) U.S. Cl.
  CPC .......... *F04D 33/00* (2013.01); *F16K 99/0015* (2013.01); *F16K 99/0048* (2013.01)

(56) References Cited

U.S. PATENT DOCUMENTS

| | | | |
|---|---|---|---|
| 10,371,136 B2* | 8/2019 | Chen et al. | ........... F04B 43/046 |
| 10,529,911 B2* | 1/2020 | Chen et al. | ............. H01L 41/09 |
| 2013/0323085 A1 | 12/2013 | Hirata et al. | |

FOREIGN PATENT DOCUMENTS

| | | |
|---|---|---|
| CN | 208702654 U | 4/2019 |
| EP | 2998582 A1 | 3/2016 |
| JP | 5776767 B2 | 9/2015 |
| TW | 201727080 A | 8/2017 |
| TW | M554535 U | 1/2018 |

\* cited by examiner

MINIATURE FLUID CONTROL DEVICE

FIELD OF THE INVENTION

The present disclosure relates to a miniature fluid control device, and more particularly to a miniature fluid control device with adjustable chamber spacing which can be adjusted by a stamping process for obtaining stable transportation flow amount.

BACKGROUND OF THE INVENTION

Nowadays, in various fields such as pharmaceutical industries, computer techniques, printing industries or energy industries, the products are developed toward elaboration and miniaturization. The fluid transportation devices are important components that are used in, for example micro pumps, micro atomizers, print heads or industrial printers. Therefore, how to enhance the transportation efficiency of miniature fluid transportation device has become an important part of development.

In some prior arts, as shown in FIG. 1A, the miniature fluid control device 1 includes a gas inlet plate 11, a resonance plate 12 and a piezoelectric actuator 13, wherein the gap h between the resonance plate 12 and the piezoelectric actuator 13 has a great influence on the transportation efficiency of the miniature fluid control device 1. In general process, the height of the gap h is controlled by the thickness of the adhesive layer 14, while the thickness of the adhesive layer 14 is influenced by the temperature and the weight of hot pressing process. Moreover, as shown in FIG. 1B, the gas inlet plate 11 may be deformed during assembly due to the material is affected by the environmental temperature. Therefore, it is very difficult to control the thickness of the adhesive layer 14, and it also causes the problem of instable transportation efficiency of the miniature fluid control device 1. Furthermore, when the height of the gap h between the resonance plate 12 and the piezoelectric actuator 13 is too short, it might cause that the piezoelectric actuator 13 and the resonance plate 12 contact interference with each other, so that the kinetic energy of both are consumed and the transportation efficiency is affected, also, the generated noise is largely increased due to the contact interference.

Therefore, there is a need of providing a miniature fluid control device to easily control the gap between the resonance plate and the piezoelectric actuator in order to maintain stable transportation efficiency, which is the main subject of the present disclosure.

SUMMARY OF THE INVENTION

An object of the present invention is to provide a miniature fluid control device, which can adjust the gap between the resonance plate and the piezoelectric actuator easily and precisely so as to provide stable transportation efficiency.

In accordance with an aspect of the present invention, a miniature fluid control device is provided and includes a gas inlet plate, a resonance plate and a piezoelectric actuator. The resonance plate is assembled and combined with the gas inlet plate. The piezoelectric actuator is assembled and combined with the resonance plate. The piezoelectric actuator includes a suspension plate, an outer frame, at least one bracket and a piezoelectric plate. The suspension plate has a first surface and a second surface. The outer frame is arranged around the suspension plate and has an assembling surface. The at least one bracket is connected between the suspension plate and the outer frame for elastically supporting the suspension plate. The piezoelectric plate is attached on the second surface of the suspension plate, wherein when a voltage is applied to the piezoelectric plate, the suspension plate is driven to undergo a bending vibration. The at least one bracket is formed between the suspension plate and the outer frame as making the first surface of the suspension plate non-coplanar with the assembling surface of the outer frame, so that a specific chamber spacing is maintained between the first surface of the suspension plate and the resonance plate.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2B:
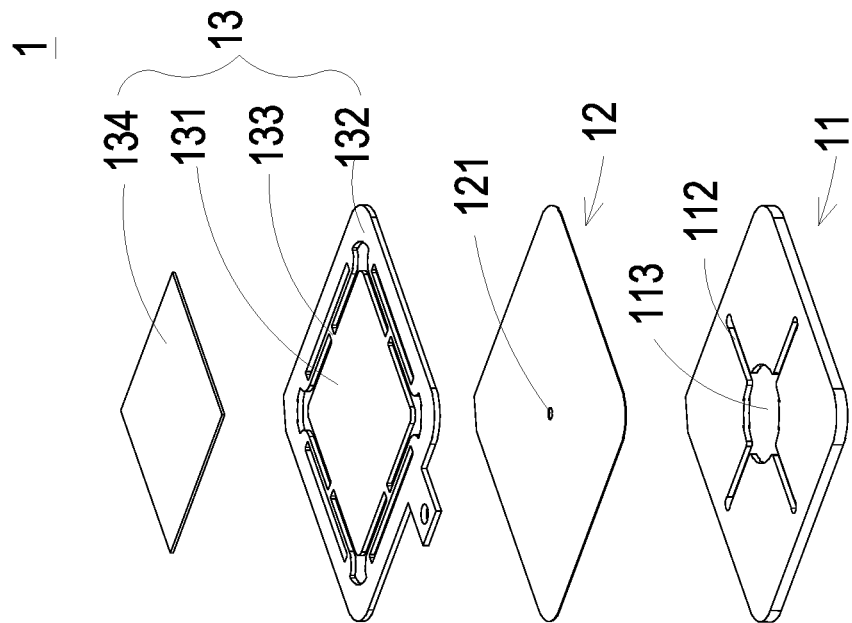
FIG. 2B is a schematic exploded view illustrating the miniature fluid control device of FIG. 2A and taken along a rear side.
Figure 2A:
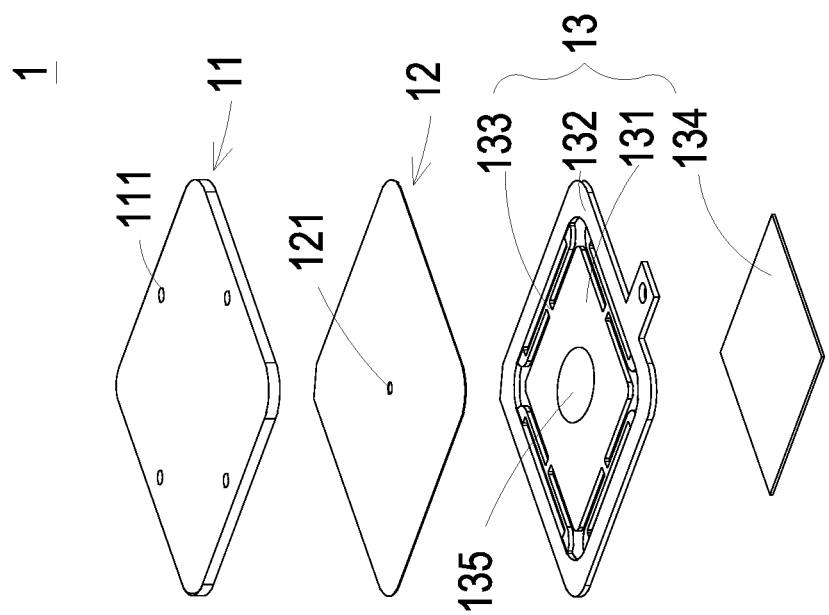
FIG. 2A is a schematic exploded view illustrating a miniature fluid control device in a semi-finished state according to an embodiment of the present disclosure and taken along a front side.
Figure 3:
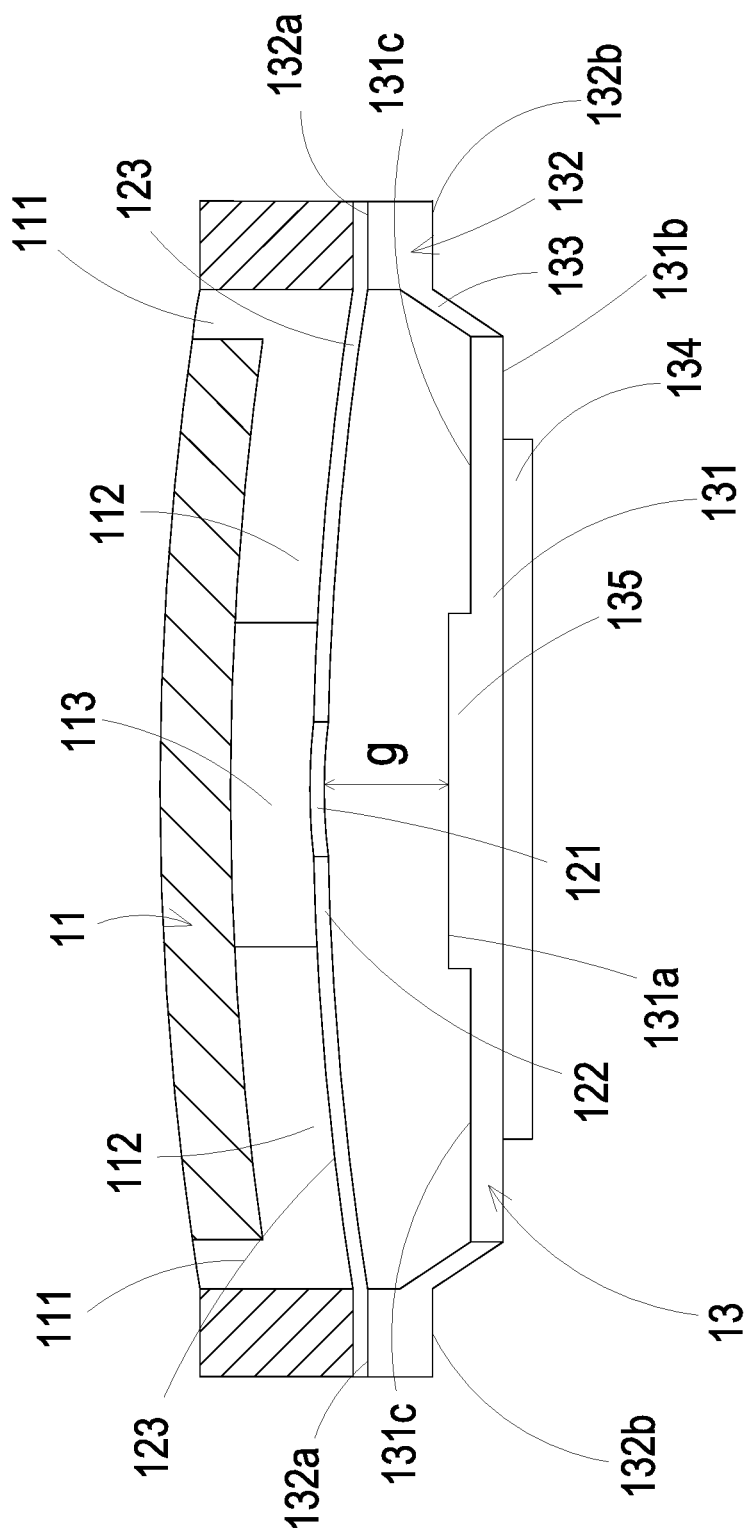
FIG. 3 is a schematic cross-sectional view illustrating the miniature fluid control device in a finished and assembled state according to the embodiment of the present disclosure.

Please refer to FIGS. 2A, 2B and 3. The present discourse provides a miniature fluid control device 1 including at least one gas inlet plate 11, at least one resonance plate 12, at least one piezoelectric actuator 13, at least one suspension plate 131, at least one outer frame 132, at least one bracket 133, at least one piezoelectric plate 134, at least one first surface 131a, at least one second surface 131b, at least one assembling surface 132a and at least one chamber spacing g. The numbers of the gas inlet plate 11, the resonance plate 12, the piezoelectric actuator 13, the suspension plate 131, the outer frame 132, the bracket 133, the piezoelectric plate 134, the first surface 131a, the second surface 131b, the assembling surface 132a and the chamber spacing g are exemplified by one for each in the following embodiments but not limited thereto. It should be noted that each of the gas inlet plate 11, the resonance plate 12, the piezoelectric actuator 13, the suspension plate 131, the outer frame 132, the bracket 133, the piezoelectric plate 134, the first surface 131a, the second surface 131b, the assembling surface 132a and the chamber spacing g can also be provided in plural numbers.

Please refer to FIGS. 2A, 2B and 3. The present disclosure provides a miniature fluid control device 1 including a gas inlet plate 11, a resonance plate 12 and a piezoelectric actuator 13.

The gas inlet plate 11 described above has at least one inlet 111, at least one convergence channel 112 and a convergence chamber 113. The number of the at least one convergence channel 112 is identical to the number of the at least one inlet 111. In this embodiment, the gas inlet plate 11 has four inlets 111 and four convergence channels 112. The numbers of the inlet 111 and the convergence channel 112 are exemplified by four for each but not limited thereto. It should be noted that each of inlet 111 and the convergence channel 112 can also be provided in a plurality of numbers. In this embodiment, the four inlets 111 are in communication with the four convergence channels 112, respectively, such that the gas entered by the four inlets 111 would be introduced into the four convergence channels 112 and converged to the convergence chamber 113.

The resonance plate 12 described above may be assembled with the gas inlet plate 11 by an adhering method. The resonance plate 12 has a central aperture 121, a movable part 122 and a fixed part 123. The central aperture 121 is disposed in the center portion of the resonance plate 12, and is facing the convergence chamber 113 of the gas inlet plate 11. The movable part 122 is a part of the resonance plate 12 located around the central aperture 121 and also facing the convergence chamber 113, while the rest of the resonance plate 12 as the peripheral part thereof which is fixed on the gas inlet plate 11 is referred to as the fixed part 123.

The piezoelectric actuator 13 described above has a suspension plate 131, an outer frame 132, at least one bracket 133 and a piezoelectric plate 134, wherein the suspension plate 131 has a first surface 131a and an opposing second surface 131b. The outer frame 132 is arranged around the periphery of the suspension plate 131. The outer frame 132 has an assembling surface 132a and a lower surface 132b. The at least one bracket 133 is connected between the suspension plate 131 and the outer frame 132 for elastically supporting the suspension plate 131. In this embodiment, as a result of the stamping process, the suspension plate 131 is concaved downwardly to be away from the resonance plate 12, and the concaved distance could be adjusted by processing, and forming the at least one bracket 133 between the suspension plate 131 and the outer frame 132. Through processing and forming the at least one bracket 133 between the suspension plate 131 and the outer frame 132, the first surface 131a of the suspension plate 131 and the assembling surface 132a of the frame 132 are non-coplanar. In other words, the first surface 131a of the suspension plate 131 is lower than the assembling surface 132a of the frame 132, and the second surface 131b of the suspension plate 131 is lower than the lower surface 132b of the frame 132. Moreover, the piezoelectric plate 134 is attached on the second surface 131b of the suspension plate 131, wherein when a voltage is applied to the piezoelectric plate 134, the suspension plate 131 is driven to undergo a bending vibration. The piezoelectric actuator 13 is attached to the fixed part 123 of the resonance plate 12 by coating a small amount of adhesive on the assembly surface 132a of the outer frame 132 and then hot pressing the resonance plate 12 and the piezoelectric actuator 13, by which the piezoelectric actuator 13 can be assembled and combined with the resonance plate 12.

In the same embodiment, the suspension plate 131 has a concave surface 131c located on the periphery of the suspension plate 131 where is also the junction of the suspension plate 131 and the at least one bracket 133. The concave surface 131c may be made by an etching process, in which the first surface 131a is partially etched downwardly to form the concave surface 131c. In such way, there is a stage difference formed between the concave surface 131c and the first surface 131a, and a bulge 135 is defined by the protruded first surface 131a with respect to the concave surface 131c.

Figure 1A:
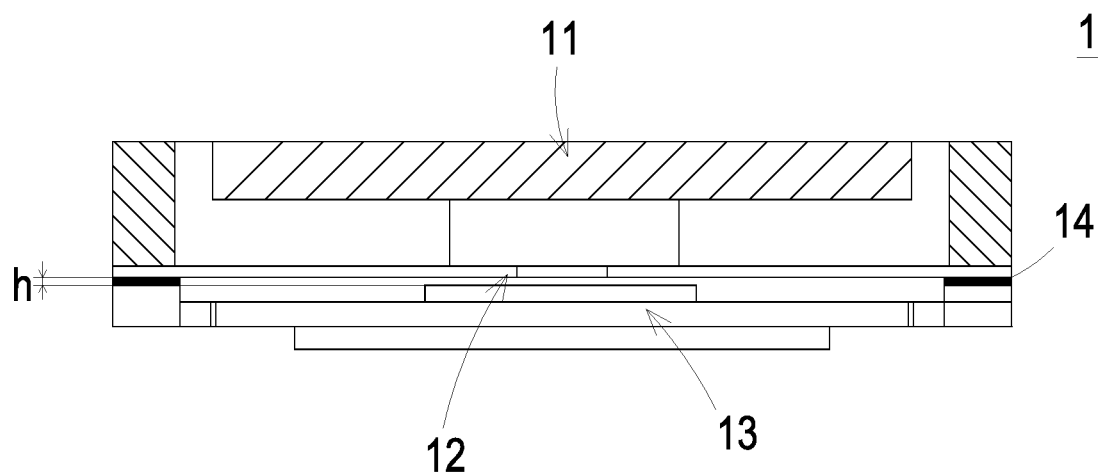
FIG. 1A is a schematic cross-sectional view illustrating the idealized assembly state of a miniature fluid transportation device without material deformation according to the prior art.
Figure 1B:
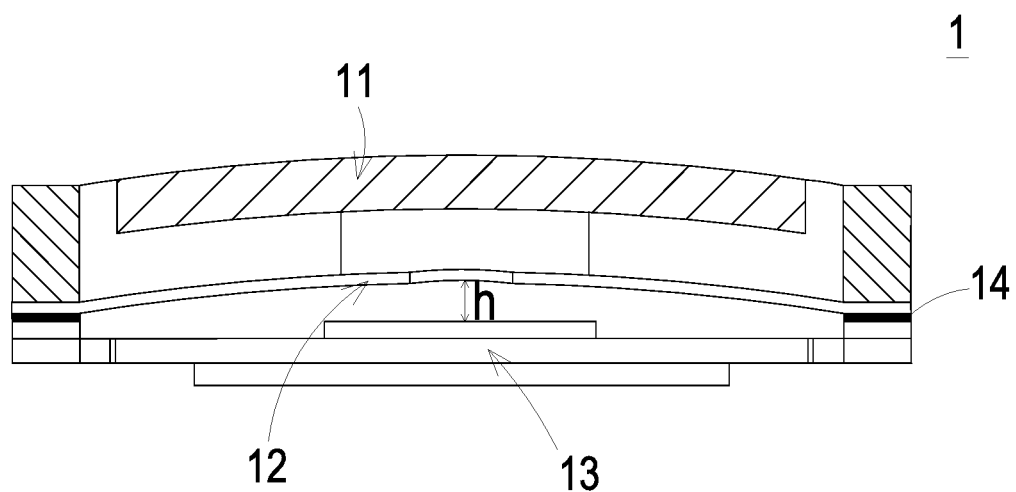
FIG. 1B is a schematic cross-sectional view illustrating the assembly state of a miniature fluid transportation device with material deformation according to the prior art.

Please refer to FIG. 3 again. The gas inlet plate 11, the resonance plate 12 and the piezoelectric actuator 13 of the miniature fluid control device 1 are stacked on each other sequentially. Moreover, a chamber spacing g is formed between the resonance plate 12 and the first surface 131a of the suspension plate 131. Due to the chamber spacing g has a great influence on the transportation efficiency of the miniature fluid control device 1, it is very important to maintain the chamber spacing g in a fixed distance to provide stable transportation efficiency. While as shown in FIG. 1B, in the prior art, the height of the gap h between the resonance plate 12 and the piezoelectric actuator 13 is mainly controlled by the thickness of the adhesive layer 14, which could be regarded that the thickness of the adhesive layer 14 of the prior art is equivalent to the chamber spacing g of the present disclosure. However, the piezoelectric actuator 13 of the prior art is combined with the resonance plate 12 by the hot pressing process, in this manufacturing process, there is a need of adjusting the parameters of the screen printing machine repeatedly in order to adjust the proper thickness of the adhesive layer 14. Under this circumstance, a great amount of time and materials are consumed. Furthermore, after the hot pressing process, it is more difficult to control the thickness of the adhesive layer 14 due to the influence of the weight and the temperature of the hot pressing process, so that the height of the gap h between the resonance plate 12 and the piezoelectric actuator 13 of the prior art is hard to be maintained. Therefore, the transportation efficiency of the miniature fluid control device 1 is extremely unstable and the yield rate is poor. In addition, when the height of the gap h between the resonance plate 12 and the piezoelectric actuator 13 is too short, it might cause that the piezoelectric actuator 13 and the resonance plate 12 contact interference with each other, so that the kinetic energy of both are consumed and the transportation efficiency is affected, and the generated noise is also increased due to the contact interference.

According to the above descriptions, please refer to FIG. 3 again. In this embodiment, the suspension plate 131 of the miniature fluid control device 1 of the present disclosure is processed by the stamping process to be concaved downwardly and away from the resonance plate 12. Consequently, the first surface 131a of the suspension plate 131 and the assembling surface 132a of the frame 132 are non-coplanar. That is, the first surface 131a of the suspension plate 131 is lower than the assembling surface 132a of the frame 132, and the second surface 131b of the suspension plate 131 is lower than the lower surface 132b of the frame 132. Consequently, a space is formed between the concaved suspension plate 131 of the piezoelectric actuator 13 and the resonance plate 12, so that the chamber spacing g is formed, and the chamber spacing g is adjustable through adjusting the angle between the suspension plate 131 and the bracket 133, which may be done by a stamping process. Since the present disclosure provides an improved structure design wherein the chamber spacing g is formed by forming the concaved suspension plate 131, the prior art in which the size of the gap h is relied on the thickness of adhesive layer 14 can be replaced. In addition, from the structural improvement as above described, the specific chamber spacing g can be obtained by forming the suspension plate 131 of the piezoelectric actuator 13 with the specific concaved distance away from the resonance plate 12, which simplifies the structural design for adjusting the chamber spacing g, and also reaches the advantages of simplifying the manufacturing process and decreasing processing time.

In sum, the present disclosure provides a miniature fluid control device having a concaved suspension plate of a piezoelectric actuator which forms a space so as to provide a chance to adjust the chamber spacing between the suspension plate and the resonance plate to be a specific distance as required. Comparing with the prior art which controls the height of the gap by the thickness of the adhesive layer, there is no need in the present disclosure to spend a large amount of time and materials to adjust the parameters of the screen printing machine repeatedly in order to adjust the chamber spacing. Consequently, the transportation efficiency of the miniature fluid control device of the present disclosure is effectively controlled, the yield rate is higher and the quality is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A miniature fluid control device, comprising:
   a gas inlet plate;
   a resonance plate assembled and combined with the gas inlet plate; and
   a piezoelectric actuator assembled and combined with the resonance plate, comprising:
      a suspension plate having a first surface and a second surface;
      an outer frame arranged around the suspension plate and having an assembling surface and a lower surface;
      at least one bracket connected between the suspension plate and the outer frame for elastically supporting the suspension plate; and
      a piezoelectric plate attached on the second surface of the suspension plate, wherein when a voltage is applied to the piezoelectric plate, the suspension plate is driven to undergo a bending vibration;
   wherein the at least one bracket is formed between the suspension plate and the outer frame as making the first surface of the suspension plate non-coplanar with the assembling surface of the outer frame, wherein the first surface of the suspension plate is lower than the assembling surface of the outer frame, and the second surface of the suspension plate is lower than the lower surface of the outer frame, so that a specific chamber spacing is maintained between the first surface of the suspension plate and the resonance plate.

2. The miniature fluid control device according to claim 1, wherein the suspension plate has a concave surface located on the junction of the suspension plate and the at least one bracket, and a stage difference is formed between the concave surface and the first surface, so that a bulge is formed on the first surface.

3. The miniature fluid control device according to claim 1, wherein the gas inlet plate comprising at least one inlet, at least one convergence channel and a convergence chamber, and the at least one convergence channel corresponds to the at least one inlet, wherein after the gas is introduced into the at least one convergence channel through the at least one inlet, the gas is guided by the at least one convergence channel and converged to the convergence chamber.

4. The miniature fluid control device according to claim 3, wherein the resonance plate having a central aperture and a movable part, wherein the central aperture is facing the convergence chamber of the gas inlet plate, and the movable part is located around the central aperture.

5. The miniature fluid control device according to claim 1, wherein the specific chamber spacing is adjusted by forming the at least one bracket between the suspension plate and the outer frame.

6. The miniature fluid control device according to claim 5, wherein the at least one bracket is formed by a stamping process between the suspension plate and the outer frame, thereby obtaining the specific chamber spacing between the first surface of the suspension plate and the resonance plate as required.

7. A miniature fluid control device, comprising:
   at least one gas inlet plate;
   at least one resonance plate assembled and combined with the gas inlet plate; and
   at least one piezoelectric actuator assembled and combined with the resonance plate, comprising:
      at least one suspension plate having at least one first surface and at least one second surface;
      at least one outer frame arranged around the suspension plate, and has at least one assembling surface and at least one lower surface;
      at least one bracket connected between the suspension plate and the outer frame for elastically supporting the suspension plate; and
      at least one piezoelectric plate attached on the second surface of the suspension plate, wherein when a voltage is applied to the piezoelectric plate, the suspension plate is driven to undergo a bending vibration;
   wherein the at least one bracket is formed between the suspension plate and the outer frame as making the first surface of the suspension plate non-coplanar with the assembling surface of the outer frame, wherein the first surface of the suspension plate is lower than the assembling surface of the outer frame, and the second surface of the suspension plate is lower than the lower surface of the outer frame, so that a specific chamber spacing is maintained between the first surface of the suspension plate and the resonance plate.

* * * * *